(12) United States Patent
Hains et al.

(10) Patent No.: US 8,951,019 B2
(45) Date of Patent: Feb. 10, 2015

(54) MULTIPLE GAS TURBINE FORWARDING SYSTEM

(75) Inventors: John Victor Hains, Simpsonville, SC (US); Gary Cletus Mobley, Greenville, SC (US); Abhijit Gupta, Bangalore (IN)

(73) Assignee: General Electric Company, Schenectady, NY (US)

( * ) Notice: Subject to any disclaimer, the term of this patent is extended or adjusted under 35 U.S.C. 154(b) by 267 days.

(21) Appl. No.: 13/599,168

(22) Filed: Aug. 30, 2012

(65) Prior Publication Data

US 2014/0060658 A1 Mar. 6, 2014

(51) Int. Cl.
*F02C 7/236* (2006.01)

(52) U.S. Cl.
CPC ...................................... *F02C 7/236* (2013.01)
USPC .. 417/5; 417/3; 417/43; 137/563; 137/565.33

(58) Field of Classification Search
CPC .................................. F02C 7/22; F02C 7/236
USPC ..................... 137/565.33, 563; 417/3, 4, 5, 43
See application file for complete search history.

(56) References Cited

U.S. PATENT DOCUMENTS

| | | | |
|---|---|---|---|
| 1,686,475 A * | 10/1928 | Southgate | 137/13 |
| 3,279,522 A * | 10/1966 | Norris et al. | 137/256 |
| 4,050,742 A | 9/1977 | Hughes et al. | |
| 4,490,105 A | 12/1984 | Hunsberger et al. | |
| 5,347,467 A * | 9/1994 | Staroselsky et al. | 700/282 |
| 5,566,709 A * | 10/1996 | Fujii et al. | 137/487.5 |
| 5,589,076 A * | 12/1996 | Womack | 210/739 |
| 5,692,680 A | 12/1997 | Harwath et al. | |
| 6,045,332 A * | 4/2000 | Lee et al. | 417/5 |
| 6,637,184 B2 | 10/2003 | Freeman | |
| 8,573,952 B2 * | 11/2013 | Stiles et al. | 417/12 |
| 2008/0289338 A1 * | 11/2008 | Desai | 60/734 |
| 2009/0151801 A1 * | 6/2009 | Gorman et al. | 137/565.11 |
| 2011/0023491 A1 | 2/2011 | Rendo et al. | |
| 2011/0271679 A1 | 11/2011 | Mestroni et al. | |

* cited by examiner

*Primary Examiner* — John Rivell
*Assistant Examiner* — Christopher Ballman
(74) *Attorney, Agent, or Firm* — Nixon & Vanderhye P.C.

(57) ABSTRACT

A fuel forwarding skid for delivering fuel from a storage area to a plurality of turbines includes at least two pumps for delivering fuel to a skid outlet line. A flow control device is connected to the pumps to control an output of the pumps. A recirculation line is in communication with the skid outlet line and is adapted to return a portion of the fuel in the skid outlet line to the storage area. A flow meter is in communication with the recirculation line to measure a rate of flow in the recirculation line, and the flow control device controls the output of at least one of the pumps in accordance with the rate of flow in the recirculation line.

20 Claims, 4 Drawing Sheets

MULTIPLE GAS TURBINE FORWARDING SYSTEM

FIELD OF THE INVENTION

The present technology relates generally to fuel supply systems and more particularly to fuel forwarding systems for multiple gas turbines.

BACKGROUND OF THE INVENTION

A system for providing liquid fuel to a gas turbine may include a forwarding skid arranged to deliver the fuel from storage tanks to the turbine. A multiple turbine arrangement may require a plurality of such skids sufficient to meet the fuel demands of the various turbines.

An existing forwarding skid known to applicants includes a two-pump arrangement having a capacity to supply fuel to only one turbine. Accordingly, with this skid configuration, a total of six forwarding skids would be required to supply a six-turbine system. The addition of each forwarding skid also requires additional piping, connections and devices.

Each forwarding skid has an inlet connected to the fuel storage tanks and an outlet to a respective turbine, thereby requiring separate piping for each additional forwarding skid. Furthermore, the fuel output from each forwarding skid must be adjusted separately. Therefore, not only is extra piping required, but additional devices are needed for each additional forwarding skid. Accordingly, for multiple-turbine arrangements, use of this existing forwarding skid is both cost prohibitive and space prohibitive.

What is needed is a fuel forwarding skid having the capacity to supply a multiple turbine system in a manner that allows effective and easy adjustment of the fuel output to each of the turbines.

BRIEF SUMMARY OF THE INVENTION

In one exemplary but non-limiting embodiment, there is provided a fuel forwarding skid for delivering fuel from a storage area to a plurality of turbines. The fuel forwarding skid includes at least two pumps for delivering fuel to at least one skid outlet line, at least one flow control device connected to the at least two pumps to control an output of the pumps, and at least one recirculation line in communication with the at least one skid outlet line and adapted to return a portion of the fuel in the at least one skid outlet line to the storage area. At least one flow meter is in communication with the at least one recirculation line to measure a rate of flow in the recirculation line, wherein the at least one flow control device controls the output of the at least one pump in accordance with the rate of flow in the at least one recirculation line.

In another exemplary but non-limiting embodiment, there is provided a method of delivering fuel via a forwarding skid from a storage area to a plurality of turbines. The plurality of turbines includes a first group and a second group of turbines. The forwarding skid includes at least first and second pumps for delivering the fuel to at least one skid outlet line, and at least one recirculation line in communication with the at least one skid outlet line and adapted to return a portion of the fuel in the at least one skid outlet line to the storage area. The method comprises steps of providing at least one flow control device connected to the at least first and second pumps to control an output of the pumps; providing at least one flow meter in communication with the at least one recirculation line to measure a flow rate in the recirculation line; initiating a first demand for a first turbine of the first group of turbines; supplying with the first pump the first demand and a first predetermined surplus; and adjusting the output of the first pump such that the flow rate in the recirculation line achieves a first predetermined value.

BRIEF DESCRIPTION OF THE DRAWINGS

The accompanying drawings facilitate an understanding of the various examples of this technology. In such drawings.

DETAILED DESCRIPTION OF THE ILLUSTRATED EMBODIMENTS

1. General Structure

Figure 1:
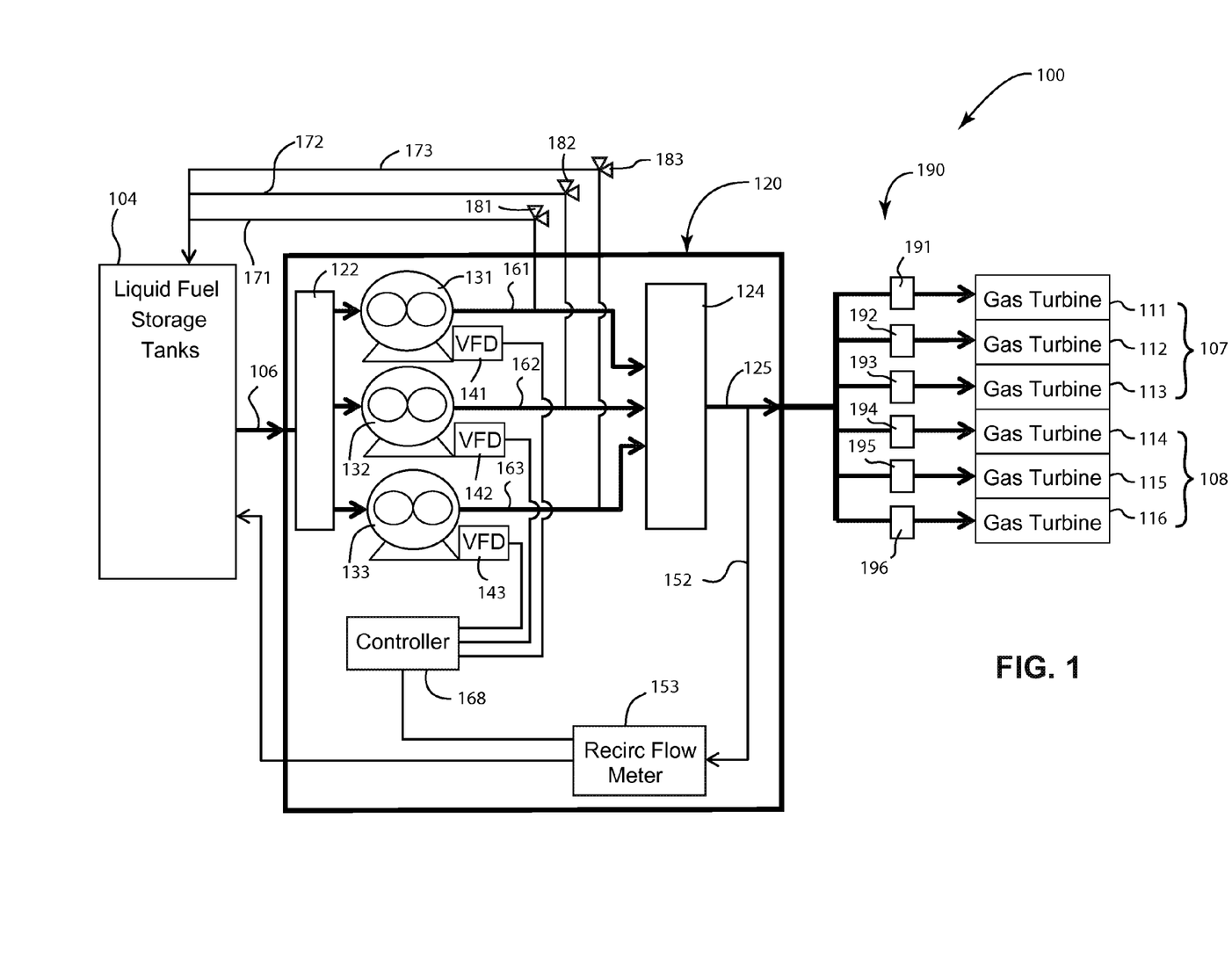
FIG. 1 is a schematic representation of a gas turbine fuel forwarding system according to a first embodiment of the disclosed technology.

Referring to FIG. 1, a gas turbine fuel forwarding system 100 is shown. The gas turbine fuel forwarding system 100 includes fuel storage tanks 104 and a fuel forwarding skid 120 adapted to supply fuel to a plurality of turbines including a first group 107 of turbines 111, 112, 113, and a second group 108 of turbines 114, 115, 116.

The fuel storage tanks 104 store liquid fuel (e.g., distillate oil, light crude, etc.). The fuel forwarding skid 120 receives the liquid fuel from an outlet 106 of the storage tanks 104 and delivers the fuel to the first and second groups of turbines 107, 108. Element 190 schematically represents a piping arrangement which delivers the fuel from the skid 120 to the turbines. The piping 190 may include a variety of pipes and connectors which are not shown in this illustration. Further, each turbine includes a dedicated flow meter 191 to 196 to measure the flow rate ahead of each turbine.

In a first embodiment of the gas turbine fuel forwarding system, the skid 120 includes an inlet manifold 122 for receiving fuel from the storage tanks 104 and an outlet manifold 124 for delivering the fuel to the turbines via a skid outlet line 125.

A group of pumps is configured to receive fuel from the inlet manifold 122 and deliver the fuel via pump lines 161, 162, 163 to the outlet manifold 124. First and second pumps 131, 132 are sufficient to meet the demands of the plurality of turbines 111 to 116. However, a backup pump 133 is provided and called into action in the event of a failure or other malfunction of the first or second pumps 131, 132. The pumps 131, 132, 133 are positive displacement pumps. Although, it is possible that another type of pump may be used as long as the pump's output can be adjusted in a predictable manner. A suitable positive displacement pump is the 3-screw pump.

Safety lines 171, 172, 173 respectively connect the pump lines 161, 162, 163 to the storage tanks 104 as a pressure release system. Valves 181, 182, 183 (e.g., check valves) are disposed on the safety lines and arranged to permit fuel to flow through the safety lines and back to the storage tanks if the pressure in the safety lines exceeds a certain level, as one skilled in the art will understand.

A plurality of variable frequency drives (VFDs) 141, 142, 143 is respectively connected to the pumps 131, 132, 133 to adjustably control an output of the pumps. A person skilled in the art will understand the use of VFDs to control the output flow rate of a pump. The VFDs may be configured as an integral part of the pumps. It is further noted that a single VFD drive may be arranged to control more than one pump.

Additionally, a recirculation line 152 is connected to the skid outlet line 125 and directs a portion of the fuel in the outlet line back to the storage tanks 104. A recirculation flow meter 153 is arranged on the recirculation line 152 to measure the flow rate in the recirculation line 152. As would be expected, when pump output increases, the flow in the skid outlet line 125 increases which in turn causes the flow rate in the recirculation line 152 to increase. In other words, there is a direct relationship between the flow rate in the skid outlet line 125 and the flow rate in the recirculation line 152 since flow in the skid outlet line 125 exceeding the gas turbine consumption level will be directed to the recirculation line 152.

A controller 168 is connected to the recirculation flow meter 153 and the VFDs 141,142,143 to control the VFDs in accordance with the flow rate in the recirculation line, as will be described later. Preferably, the controller 168 is arranged on the skid 120; however, it is noted that the controller may be disposed at a location outside of the skid.

Figure 2:
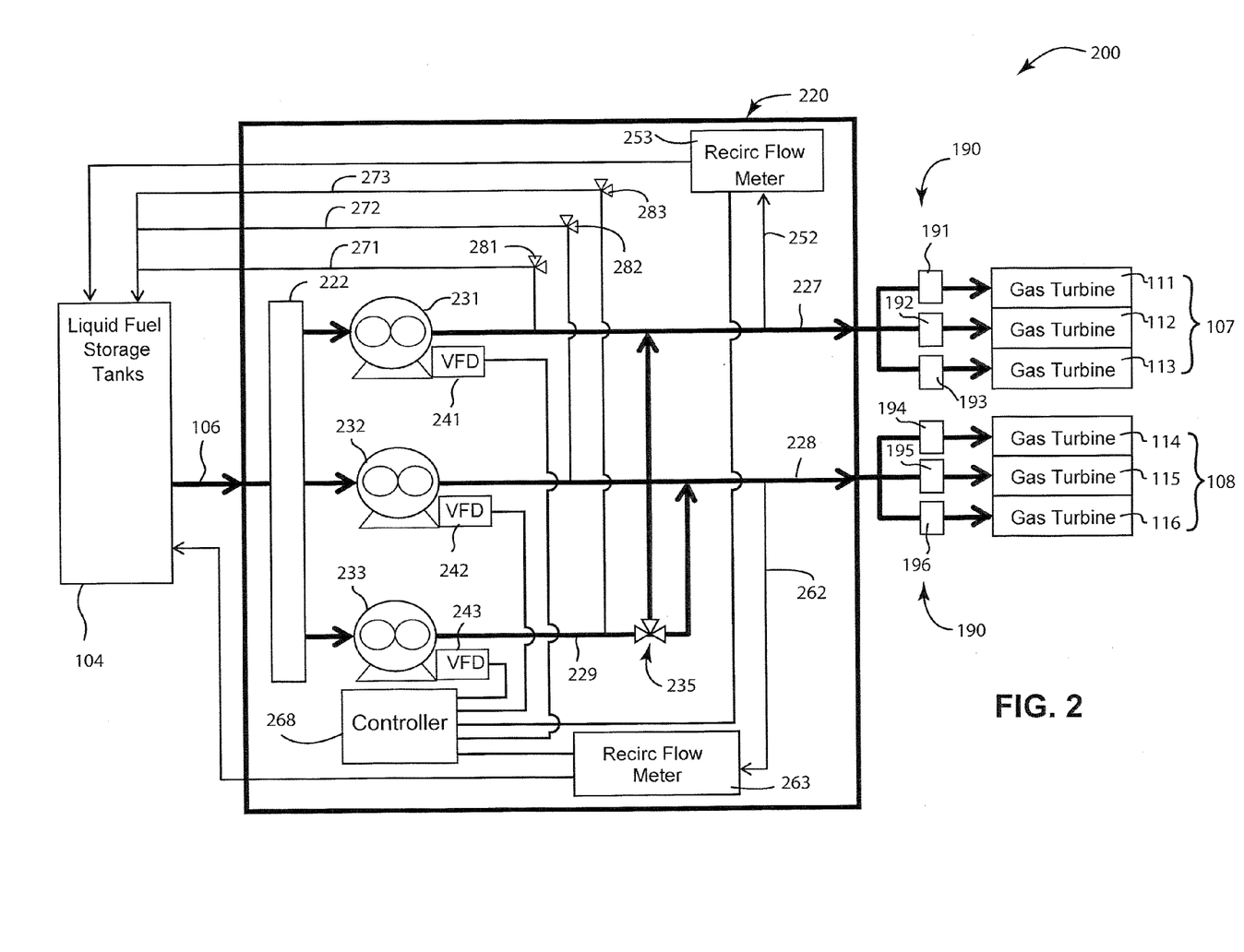
FIG. 2 is a schematic representation of a gas turbine fuel forwarding system according to a second embodiment of the disclosed technology.

Referring to FIG. 2, a second embodiment of the gas turbine fuel forwarding system 200 will be described. The gas turbine fuel forwarding system 200 is similar to the gas turbine fuel forwarding system 100; however, the skid 220 of the gas turbine fuel forwarding system 200 includes a pump and recirculation line arrangement that is different from the skid 120.

The skid 220 includes an inlet manifold 222 for receiving fuel from the storage tanks 104 and first and second skid outlet lines 227, 228 for delivering the fuel to the turbines 111 to 116.

A first pump 231 and a second pump 232 are configured to receive fuel from the inlet manifold 222 and respectively deliver the fuel to the first and second skid outlet lines 227, 228. As shown in FIG. 2, the first skid outlet line 227 is dedicated to the first group of turbines 107 and the second skid outline line 228 is dedicated to the second group of turbines 108. As such, the first pump 231 has a capacity that sufficiently meets the demand of the first group of turbines 107 and the second pump 232 has a capacity that sufficiently meets the demand of the second group of turbines 108. A backup pump 233 outputs fuel to a backup line 229 that is selectively connectable to the first and second skid outline lines 227, 228 via a three-way valve 235. The backup pump 233 is called into action on the occasion of a failure or other malfunction of the first or second pumps 231, 232.

Safety lines 271, 272, 273 respectively connect the first skid outlet line 227, the second skid outlet line 228 and the backup line 229 to the storage tanks 104 as a pressure release system. Valves 281, 282, 283 (e.g., check valves) are similar to the valves 181, 182, 183 described above and function, respectively, to release pressure in the first skid outlet line 227, the second skid outlet line 228 and the backup line 229 in the same manner described above with regard to the valves 181, 182, 183.

A plurality of variable frequency drives (VFDs) 241, 242, 243 is respectively connected to the pumps 131,132,133 to adjustably control an output of the pumps. A person skilled in the art will understand the use of VFDs to control the output flow rate of a pump. Similar to the VFDs 141, 142, 143 described above in the first embodiment, the VFDs 241, 242, 243 may be configured as an integral part of the pumps. It is also noted that a single VFD drive may be arranged to control more than one pump.

A first recirculation line 252 is connected to the first skid outlet line 227 and directs a portion of the fuel in the first skid outlet line 227 back to the storage tanks 104. A first recirculation flow meter 253 is arranged on the first recirculation line 252 to measure a flow rate in the first recirculation line 252. A second recirculation line 262 is connected to the second skid outlet line 228 and directs a portion of the fuel in the second skid outlet line back to the storage tanks 104. Further, a second recirculation flow meter 263 is arranged on the recirculation line 262 to measure a flow rate in the recirculation line 262. Thus, as output of the first pump 231 increases so does the flow rate in the first recirculation line 252 since flow in the first skid outlet line 227 exceeding the gas turbine consumption level will be directed to the recirculation line 252. Similarly, as output of the second pump 232 increases so does the flow rate in the second recirculation line 262 since flow in the second skid outlet line 228 exceeding the gas turbine consumption level will be directed to the recirculation line 262.

A controller 268 is connected to the recirculation flow meters 253, 263 and the VFDs 241, 242, 243 to control the VFDs in accordance with the flow rates in the recirculation lines, as will be described later.

2. Operation

Operation of the gas turbine fuel forwarding systems 100, 200 will now be described according to examples of the disclosed technology. In the following examples, the demand of each turbine is 120 gallons per minute (GPM), the predetermined flow rate in the recirculation lines is 10 GPM, and the predetermined surplus is 10% of the current total demand. Particularly, if has been found that controlling the fuel forwarding systems to maintain a relatively low flow rate in the recirculation lines results in an optimum flow rate and flow pressure to the gas turbines.

As mentioned above, the recirculation flow rate is 10 GPM in the following examples. It is noted, however, that other flow rates may be suitable. It should also be noted that the recirculation flow rate will likely be higher than 10 GPM in a fuel system employing turbines having a greater fuel demand than the turbines in the illustrated examples.

2.1 Process of Supplying Fuel to the Multiple Turbine System

Figure 3:
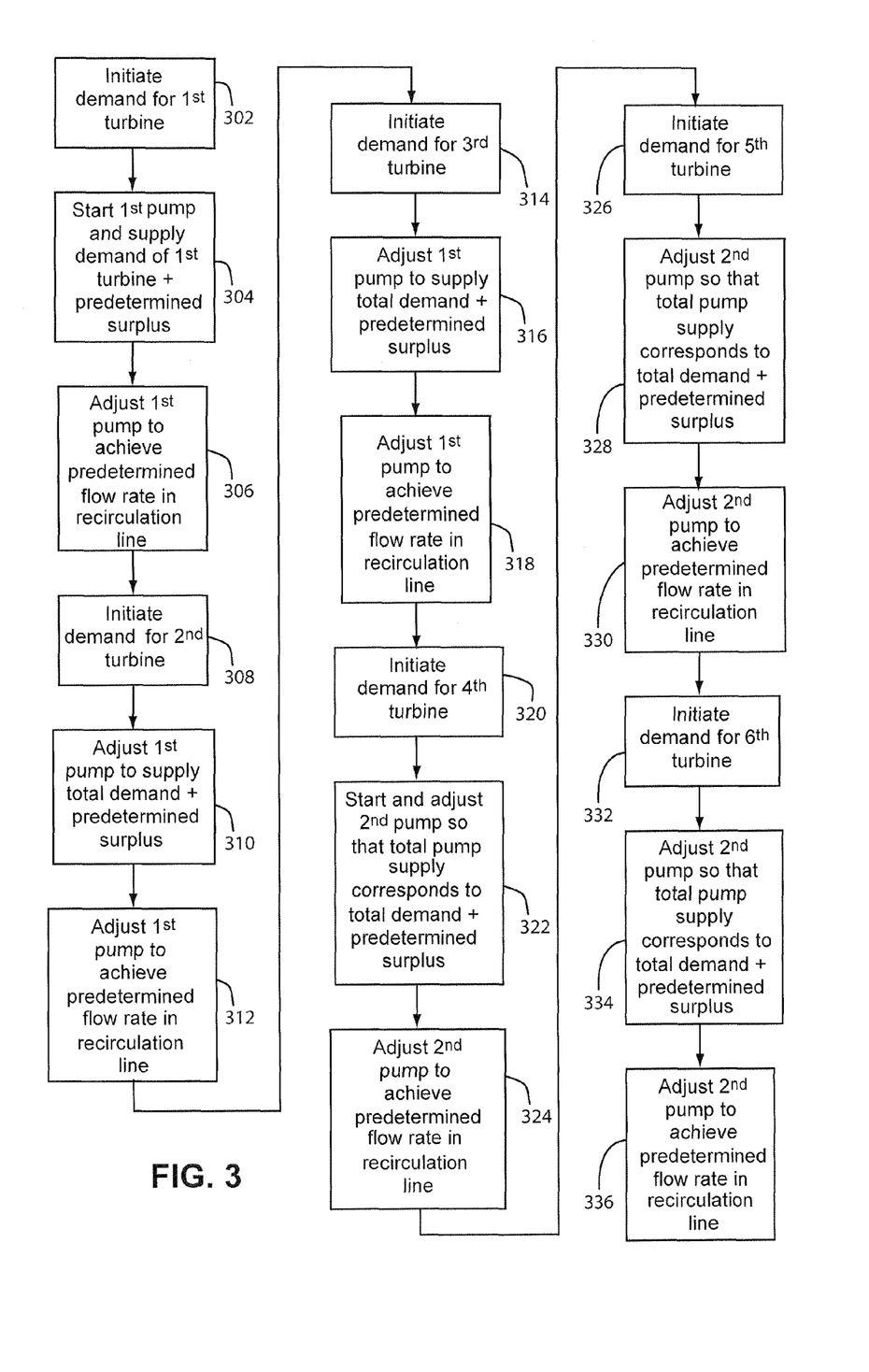
FIG. 3 is a block diagram showing a process of bringing turbines online in a multiple gas turbine system in accordance with an example of the disclosed technology.

In accordance with an example of the disclosed technology, the controllers 168, 268 may be configured to implement methods of supplying fuel to a plurality of turbines. In particular, FIG. 3 illustrates a method of supplying fuel to the plurality of turbines 111 to 116 as they are brought online.

In step 302, a fuel supply demand for the first turbine 111 is initiated (or made known to the controller 168,268). In response, the first pump 131, 231 is started and operated to supply the demand of the first turbine 111 with the addition of the predetermined surplus, as represented by step 304. As mentioned above, the predetermined surplus is 10% of the current demand. Thus, in step 304, the first pump 131, 231 is controlled to supply 132 GPM. The predetermined surplus provides a margin to ensure that pump supply is sufficient to meet the current demand. Once the flow rate in the recirculation lines is determined, the pumps are adjusted on the basis of the recirculation flow rate measurement.

Therefore, in step 306, the first pump is adjusted to achieve the predetermined flow rate in the recirculation line 152, 252. Next, a fuel supply demand for the second turbine 112 is initiated, in step 308. In step 310, the first pump 131,231 is adjusted to supply the total demand of the first and second turbines 111, 112 with the addition of the predetermined surplus. Then, in step 312, the first pump is adjusted to achieve the predetermined flow rate in the recirculation line 152, 252.

A fuel supply demand for the third turbine 113 is initiated, in step 314. In step 316, the first pump 131,231 is adjusted to supply the total demand of the first, second and third turbines 111,112, 113 with the addition of the predetermined surplus. Next, in step 318, the first pump is adjusted to achieve the predetermined flow rate in the recirculation line 152, 252.

Still referring to FIG. 3, a fuel supply demand for the fourth turbine 114 is initiated, in step 320. Then, in step 322, the second pump 132, 232 is started and adjusted such that the total pump supply (first and second pumps) corresponds to the total demand of the first, second, third and fourth turbines 111, 112, 113, 114, with the addition of the predetermined surplus. It is noted that the first pump 131, 231 operates at constant speed as the fourth turbine 114 is brought online. That is, once the first, second and third turbines 111, 112, 113 are brought online and the first pump is adjusted to reach the predetermined recirculation flow rate, any demand or adjustment related to the second group of turbines 108 will be first addressed through action of the second pump 132, 232. Accordingly, in step 324, the second pump 132, 232 is adjusted to achieve the predetermined flow rate in the recirculation lines 152, 262.

In step 326, a fuel supply demand for the fifth turbine 115 is initiated. Then, in step 328, the second pump 132, 232 is adjusted such that the total pump supply corresponds to the total demand of the first, second, third, fourth and fifth turbines 111, 112, 113, 114, 115, with the addition of the predetermined surplus. In step 330, the second pump 132, 232 is adjusted to achieve the predetermined flow rate in the recirculation lines 152, 262.

A fuel supply demand for the sixth turbine 116 is initiated in step 332. In step 3334, the second pump 132, 232 is adjusted such that the total pump supply corresponds to the total demand of the first, second, third, fourth, fifth and sixth turbines 111, 112, 113, 114, 115, 116, with the addition of the predetermined surplus. Finally, in step 336, the second pump 132,232 is adjusted to achieve the predetermined flow rate in the recirculation lines 152, 262.

2.2 Control Scheme in the Event of a Tripped Turbine

Figure 4:
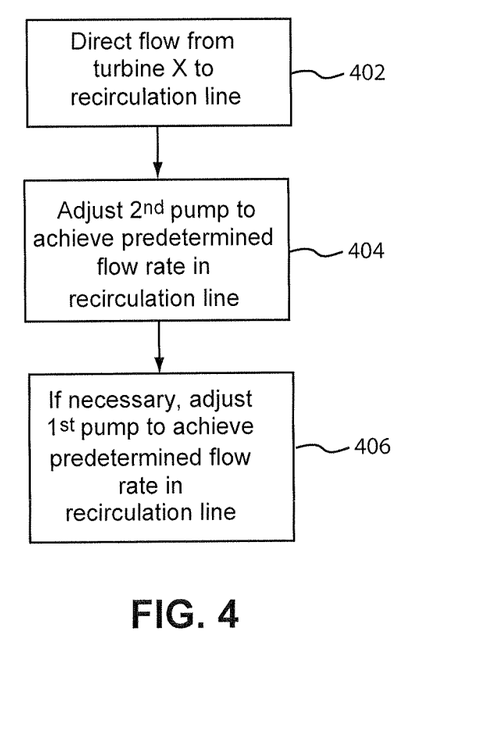
FIG. 4 is a block diagram showing a process of responding to a tripped turbine in accordance with an example of the disclosed technology.

In accordance with an example of the disclosed technology, the controllers 168, 268 may be configured to implement a method of responding to a turbine trip, sudden shutdown, or other failure of a turbine, as shown in FIG. 4. Once a turbine trip or similar event has been detected, the system directs the excess flow from the tripped turbine "X" to the recirculation line 152, as represented by step 402. This results in a sudden increase in the recirculation flow rate. One skilled in the art will appreciate that the referenced turbine "X" may refer to any of the plurality of turbines 111 to 116 or any number of the plurality of turbines.

In step 404, the second pump 132 is adjusted to achieve the predetermined flow rate in the recirculation line 152 (e.g., 10 GPM). If the second pump is idle, the system will skip to step 406. In step 406, the first pump 131 is adjusted, if necessary, to achieve the predetermined flow rate in the recirculation line 152.

In the case of a turbine trip when using the skid 200, after the flow from the tripped turbine is directed to the respective recirculation line 252, 262, the respective pump 231, 232 is adjusted to achieve the predetermined flow rate in the respective recirculation line 252, 262.

By this method, the fuel intended for the failed turbine is immediately directed to the recirculation line and the pump output subsequently scaled down to meet the new demand.

The disclosed system monitors the recirculation flow rate to adjust the operation of its pumps to maintain an appropriate fuel flow rate to the gas turbines, in addition to a buffer in case any gas turbine operation instability occurs. The system does not rely on a signal from the gas turbine or exterior devices to detect a trip which allows the skid to monitor and sense changes in gas turbine operation and flow rate needs.

2.3 System Check for Flow Rate Outside Predetermined Range

The controller 168 may be configured to periodically check the flow rate in the recirculation line 152. If it is detected that the recirculation flow rate is outside of a predetermined range, e.g., a range of 8-20 GPM in an example having a predetermined 10 GPM recirculation flow, the controller may initiate a response to correct the flow rate by first tuning the second pump 132, and then the first pump 131, if necessary, to achieve the predetermined flow rate in the recirculation line 152. This check does not require a gas turbine trip or shut down, as the system monitors and corrects fuel flow fluctuations irrespective of a trip or shut down event.

In the case of the skid 200, the controller 268 may initiate a response to correct the affected recirculation flow rate by tuning the respective pump 231, 232.

2.4 System Check for Pump RPM Drift

Since the pumps do not have set RPM levels, the controller 168 may be configured to detect a change in the RPM of the pumps 131, 132. In response to an RPM change outside a predetermined range, the controller may initiate a check of the flow rate in the recirculation line 152. If the flow rate is outside of a predetermined range, the controller may further initiate a response to correct the flow rate by first tuning the second pump 132, and then the first pump 131, if necessary, to achieve the predetermined flow rate in the recirculation line.

In the case of the skid 200, the controller 268 may initiate a check of the flow rate in the recirculation lines 252, 262 and if the flow rates are outside of a predetermined range, the controller may further initiate a response to correct the flow rates by tuning the respective pump 231, 232.

2.5 Control Scheme in the Event of Recirculation Flow Meter Failure

The turbine fuel systems 100, 200 described herein rely on a measure of the flow rate in a recirculation line to control pump output. In the event of a flow meter failure, the system may be configured to estimate the flow rate in the recirculation line.

The system may first estimate the recirculation flow by using the equations:

$$T \times S = f$$

where T is the number of turbines in operation, S is the standard predetermined base load fuel flow rate that each gas turbine consumes, and f is the flow rate that should be supplied, and $$p - f = e$$

where p is the pump output calculated by pump RPM, since in the illustrated example, the pumps are positive displacement pumps which move a known volume of fluid for every revolution or rotation, and e is the estimated recirculation flow rate.

The system may also sum the flow rate indicated by the flow meters 191-196 to determine the total flow that the gas turbines are actually consuming.

Further, if it is suspected that the recirculation flow meter has given an incorrect measurement, the following equation may be used to check the measurement:

$$p - (F_c + R_m) = \sim 0$$

where $F_c$ is the fuel consumed and is calculated by summing the readings on the flow meters 191-196, and $R_m$ is the recirculation flow rate as measured by the recirculation flow meters.

While the invention has been described in connection with what is presently considered to be the most practical and preferred examples, it is to be understood that the invention is not to be limited to the disclosed examples, but on the contrary, is intended to cover various modifications and equivalent arrangements included within the spirit and scope of the appended claims.

What is claimed is:

1. A fuel forwarding skid for delivering fuel from a storage area to a plurality of turbines, comprising:
   at least two pumps for delivering fuel to at least one skid outlet line;
   at least one flow control device connected to the at least two pumps to control an output of the pumps;
   at least one recirculation line in communication with the at least one skid outlet line and adapted to return a portion of the fuel in the at least one skid outlet line to the storage area; and
   at least one flow meter in communication with the at least one recirculation line to measure a rate of flow in the recirculation line,
   wherein the at least one flow control device controls the output of at least one of the pumps in accordance with the rate of flow in the at least one recirculation line.

2. The fuel forwarding skid of claim 1, wherein the at least two pumps are positive displacement pumps.

3. The fuel forwarding skid of claim 1, wherein the at least one control device is a variable frequency device.

4. The fuel forwarding skid of claim 1, further comprising a controller in communication with the at least one flow control device and the at least one flow meter to control the flow control device.

5. The fuel forwarding skid of claim 1, wherein the at least two pumps includes first, second and third pumps, the first and second pumps are sufficient to supply a demand of the plurality of turbines, and the third pump is arranged as a back up to the first and second pumps.

6. The fuel forwarding skid of claim 5, wherein the at least one skid outlet line includes first and second skid outlet lines, the first pump is in communication with the first skid outlet line and adapted to supply a first portion of the plurality of turbines, the second pump is in communication with the second skid outlet line and adapted to supply a second portion of the plurality of turbines.

7. The fuel forwarding skid of claim 6, wherein the third pump selectively communicates with the first and second skid outlet lines.

8. The fuel forwarding skid of claim 7, further comprising a three-way valve connecting the third pump to the first and second skid outlet lines.

9. The fuel forwarding skid of claim 5, wherein the at least one recirculation line includes two recirculation lines in respective communication with the first and second skid outlet lines, and the at least one flow meter includes two flow meters in respective communication with the two recirculation lines.

10. The fuel forwarding skid of claim 5, wherein the at least one flow control device includes first, second and third flow control devices associated respectively with the first, second and third pumps.

11. A method of delivering fuel via a forwarding skid from a storage area to a plurality of turbines, the plurality of turbines including a first group and a second group of turbines, the forwarding skid including at least first and second pumps for delivering the fuel to at least one skid outlet line, and at least one recirculation line in communication with the at least one skid outlet line and adapted to return a portion of the fuel in the at least one skid outlet line to the storage area, comprising:
   providing at least one flow control device connected to the at least first and second pumps to control an output of the pumps;
   providing at least one flow meter in communication with the at least one recirculation line to measure a flow rate in the recirculation line;
   initiating a first demand for a first turbine of the first group of turbines;
   supplying with the first pump the first demand and a first predetermined surplus; and
   adjusting the output of the first pump such that the flow rate in the recirculation line achieves a first predetermined value.

12. The method of claim 11, further comprising:
   initiating a second demand for a second turbine of the second group of turbines;
   adjusting the output of the second pump such that a total supply of the first and second pumps corresponds to a sum of the first demand, the second demand and a second predetermined surplus; and
   adjusting the output of the second pump such that the flow rate in the recirculation line achieves a second predetermined value.

13. The method of claim 11, further comprising:
   detecting a trip in one of the plurality of turbines;
   directing fuel intended for the tripped turbine from the at least one skid outlet line to the recirculation line; and
   adjusting the output of the first pump such that the flow rate in the recirculation line achieves a third predetermined value.

14. The method of claim 12, further comprising:
   detecting a trip in one of the plurality of turbines;
   directing fuel intended for the tripped turbine from the at least one skid outlet line to the recirculation line; and
   adjusting the output of the second pump such that the flow rate in the recirculation line achieves a fourth predetermined value;
   adjusting the output of the first pump such that the flow rate in the recirculation line achieves the fourth predetermined value if the fourth predetermined value is not achieved through the adjustment of the second pump.

15. The method of claim 12, wherein the first and second predetermined values are the same.

16. The method of claim 13, wherein the first, second and third predetermined values are the same.

17. The method of claim 14, wherein the first, second and fourth predetermined values are the same.

18. The method of claim 12, further comprising:
   detecting a malfunction in the flow meter; and
   adjusting the output of the first and/or second pump to achieve an estimated recirculation flow rate based on a predetermined equation.

19. The method of claim 12, further comprising:
   detecting that the flow rate in the recirculation line is outside a predetermined range;
   adjusting the output of the second pump such that the flow rate in the recirculation line achieves the second predetermined value; and
   adjusting the output of the first pump such that the flow rate in the recirculation line achieves the second predetermined value if the second predetermined value is not achieved through the adjustment of the second pump.

20. The method of claim 12, further comprising:

detecting a change in a revolutions per minute (RPM) of at least one of the first and second pumps;

adjusting the output of the second pump such that the flow rate in the recirculation line achieves the second predetermined value; and adjusting the output of the first pump such that the flow rate in the recirculation line achieves the second predetermined value if the second predetermined value is not achieved through the adjustment of the second pump.

* * * * *

UNITED STATES PATENT AND TRADEMARK OFFICE
CERTIFICATE OF CORRECTION

| | | |
|---|---|---|
| PATENT NO. | : 8,951,019 B2 | Page 1 of 1 |
| APPLICATION NO. | : 13/599168 | |
| DATED | : February 10, 2015 | |
| INVENTOR(S) | : Hains et al. | |

It is certified that error appears in the above-identified patent and that said Letters Patent is hereby corrected as shown below:

Title Page, item (54) and in the Specification, Column 1, lines 1-2, change the title "MULTIPLE GAS TURBINE FORWARDING SYSTEM" to --MULTIPLE GAS TURBINE FUEL FORWARDING SYSTEM--.

Signed and Sealed this
Seventh Day of June, 2016

Michelle K. Lee
*Director of the United States Patent and Trademark Office*